(12) United States Patent
Barriere et al.

(10) Patent No.: US 7,538,156 B2
(45) Date of Patent: May 26, 2009

(54) FLUOROPOLYMER-BASED MASTERBATCH AND ITS USE FOR THE EXTRUSION OF POLYOLEFINS

(75) Inventors: Benoit Barriere, Le Tilleul Othon (FR); Anthony Bonnet, Beaumont le Roger (FR); Johann Laffargue, Bernay (FR); Gilles Marot, Bernay (FR)

(73) Assignee: Arkema France, Colombes (FR)

( * ) Notice: Subject to any disclaimer, the term of this patent is extended or adjusted under 35 U.S.C. 154(b) by 501 days.

(21) Appl. No.: 11/181,266

(22) Filed: Jul. 14, 2005

(65) Prior Publication Data

US 2006/0025523 A1     Feb. 2, 2006

Related U.S. Application Data

(60) Provisional application No. 60/616,264, filed on Oct. 6, 2004.

(30) Foreign Application Priority Data

Jul. 16, 2004   (FR) .................................. 04 07919

(51) Int. Cl.
*C08G 63/91*   (2006.01)
(52) U.S. Cl. ........................... 525/10; 524/500; 525/50; 525/199
(58) Field of Classification Search .................... 525/10, 525/199, 50; 524/500
See application file for complete search history.

(56) References Cited

U.S. PATENT DOCUMENTS

| | | | | |
|---|---|---|---|---|
| 5,015,693 A | * | 5/1991 | Duchesne et al. | 525/187 |
| 5,527,858 A | * | 6/1996 | Blong et al. | 525/187 |
| 5,587,429 A | * | 12/1996 | Priester | 525/187 |
| 6,048,939 A | * | 4/2000 | Priester | 525/198 |
| 6,599,982 B2 | * | 7/2003 | Oriani | 525/191 |
| 6,642,310 B2 | * | 11/2003 | Chapman et al. | 525/101 |
| 6,734,252 B1 | * | 5/2004 | Woods | 525/187 |
| 6,906,137 B2 | * | 6/2005 | Oriani et al. | 525/165 |
| 2008/0097034 A1 | * | 4/2008 | Ho et al. | 525/199 |

FOREIGN PATENT DOCUMENTS

WO   WO-00/44829   *   8/2000

* cited by examiner

*Primary Examiner*—Peter D. Mulcahy
*Assistant Examiner*—Henry Hu
(74) *Attorney, Agent, or Firm*—Thomas F. Roland

(57) ABSTRACT

The present invention relates to a masterbatch comprising by weight:
  from 1 to 50% of a blend of at least one fluoropolymer (A) and at least one interfacial agent (B);
  from 99 to 50% of a polyolefin (C);
  such that the two constituents (A) and (B) are intimately blended beforehand at a temperature such that at least one is in the melt state throughout its mass or on its surface, and are then blended with the polyolefin (C). The invention also relates to the use of the masterbatch as a processing aid for extruding a polyolefin (D), in particular for extruding a film-form polyolefin. The invention also relates to the process for obtaining the masterbatch.

16 Claims, No Drawings

US 7,538,156 B2

FLUOROPOLYMER-BASED MASTERBATCH AND ITS USE FOR THE EXTRUSION OF POLYOLEFINS

This application claims benefit, under U.S.C. §119(a) of French National Applications Number 04.07919, filed Jul. 16, 2004; and also claims benefit, under U.S.C. §119(e) of U.S. Provisional Application 60/616,264, filed Oct. 6, 2004.

FIELD OF THE INVENTION

The present invention relates to a fluoropolymer-based masterbatch and to its use for the extrusion of polyolefins. During the extrusion of polyolefins, irregularities in the flow may occur at the die exit, resulting in surface defects and sometimes impairment of the mechanical properties. The remedy consists in adding a processing aid to the polyolefin that has to be extruded. This processing aid comprises a fluoropolymer and an interfacial agent that are diluted in a polyolefin identical to or little different from the polyolefin that it is desired to extrude. This polyolefin containing the fluoropolymer and the interfacial agent is also called a "masterbatch". The masterbatch is added to the polyolefin to be extruded at any point before the extrusion die. The invention relates to these masterbatches.

BACKGROUND OF THE INVENTION

During the extrusion of a plastic, in particular of polyolefins, flow irregularities appear at the die exit when a critical shear rate is exceeded. Below this critical rate the extruded materials are smooth, whereas above it surface defects are observed. These defects, called "melt fracture", take several forms. At a shear rate slightly above the critical rate, films obtained by extrusion-blowing lose their transparency and their gloss. At substantially higher rates, corresponding to higher productivity, inhomogeneities with smooth regions in a rough surface appear. These defects significantly reduce the optical and mechanical properties of the film. The same phenomena may be observed on extruded rods. When the surface of the rods loses its gloss, becoming dull and rough, it is often compared with an "orange peel".

The prior art has already proposed the addition of processing aids.

Thus, in U.S. Pat. No. 3,334,157, the incorporation of polytetrafluoroethylene improves the optical properties of the polyethylene film.

According to U.S. Pat. No. 4,855,360, U.S. Pat. No. 5,587,429, U.S. Pat. No. 6,734,252 and U.S. Pat. No. 6,894,118, a fluoroelastomer in combination with a polyoxyalklene (polyoxyethylene glycol denoted also by PEG) is used to improve the conversion of hydrocarbon polymers. However, the fluoropolymer and the PEG are added as such, without any particular precaution, to the polyolefin in order to form the masterbatch. In these examples of the prior art, the fluoropolymer and the PEG are diluted in a polyolefin to form a masterbatch, and then the masterbatch is added to the polymer to be extruded.

U.S. Pat. No. 5,015,693, the PEG and the fluoropolymer may be mixed both in the melt state before being introduced into the material for extrusion. Mixing cannot be very intimate. This is because a fluoropolymer generally has a melting temperature of the order of 200-300° C. and because at this temperature the PEG exhibits a very low viscosity, making it poorly suited for intimate mixing with the fluoropolymer.

Organophosphates or organophosphites in combination with a fluoroelastomer have been described in U.S. Pat. No. 4,983,677 and U.S. Pat. No. 4,863,983, again to improve the conversion of hydrocarbon polymers.

It has been discovered that if the fluoropolymer and the PEG are intimately preblended before they are added to the polyolefin in order to form the masterbatch, the processing aid obtained is more effective. The term "more effective" is understood to mean in comparison with a masterbatch prepared by simple addition of the fluoropolymer and the PEG without intimate preblending before they are added to the polyolefin to form the masterbatch.

SUMMARY OF THE INVENTION

The present invention relates to a masterbatch comprising by weight:
- from 1 to 50% of a blend of at least one fluoropolymer (A) and at least one interfacial agent (B);
- from 99 to 50% of a polyolefin (C);
- such that the two constituents (A) and (B) are intimately melt-blended beforehand at low temperature, so that at least one is in the melt state throughout its mass or on its surface, and are then blended with the polyolefin (C).

The masterbatch is in the form of granules or a powder.

The invention also relates to the process of obtaining the masterbatch in which:
1). at least one fluoropolymer (A) and at least one interfacial agent (B) are mixed intimately in a melt medium at low temperature, so that at least one is in the melt state throughout its mass or on its surface;
2). the blend obtained in step 1). is subsequently incorporated into a polyolefin (C), to form the masterbatch in granule form;
3). optionally, the masterbatch granules of step 2 are reground to give a powder of the masterbatch.

The invention also relates to the use of the masterbatch as a processing aid for extruding a polyolefin (D), in particular for extruding a film-form polyolefin.

DETAILED DESCRIPTION OF THE INVENTION

With regard to the fluoropolymer (A), this denotes any polymer that has in its chain at least one monomer chosen from compounds containing a vinyl group capable of opening, in order to be polymerized, and that contains, directly attached to this vinyl group, at least one fluorine atom, a fluoroalkyl group or a fluoroalkoxy group.

By way of examples of monomers, mention may be made of vinyl fluoride, vinylidene fluoride (VDF), tri-fluoroethylene (VF3), chlorotrifluoroethylene (CTFE), 1,2-difluoroethylene, tetrafluoroethylene (TFE), hexafluoropropylene (HFP) and perfluoro(alkylvinyl) ethers.

The fluoropolymer may be a homopolymer or a copolymer and it may also include non-fluorinated monomers, such as ethylene.

By way of examples, the fluoropolymer is chosen from:
homopolymers and copolymers of vinylidene fluoride (VDF) preferably containing at least 50% by weight of VDF, the comonomer being chosen from chlorotrifluoroethylene (CTFE), hexafluoropropylene (HFP), trifluoroethylene (VF3) and tetrafluoroethylene (TFE);
homopolymers and copolymers of trifluoro-ethylene (VF3); and
copolymers and especially terpolymers, combining the residues of chlorotrifluoroethylene (CTFE), tetrafluoroethylene (TFE), hexafluoropropylene (HFP) and/or ethylene units and optionally VDF and/or VF3 units.

Advantageously, the fluoropolymer is a polyvinylidene fluoride (PVDF) homopolymer or copolymer. Preferably, the PVDF contains, by weight, at least 50%, more preferably at least 75% and better still at least 85% VDF. The comonomer is advantageously HFP.

Advantageously, the PVDF has a viscosity ranging from 100 Pa·s to 2000 Pa·s, the viscosity being measured at 230° C. with a shear rate of 100 s$^{-1}$ using a capillary rheometer. Preferably, the PVDF has a viscosity ranging from 300 Pa·s to 1200 Pa·s, the viscosity being measured at 230° C. with a shear rate of 100 s$^{-1}$ using a capillary rheometer.

Thus, the PVDFs sold under the brand name KYNARFLEX® are perfectly suitable for this formulation and this process.

With regard to the interfacial agent (B), this denotes any product such that, when it is blended with (A) under the abovementioned conditions in order to form a masterbatch, this masterbatch then being used as a processing aid, the extrusion of polyolefins is improved. As examples of interfacial agent (B), mention may be made of: silicones; silicone-polyether copolymers; aliphatic polyesters; aromatic polyesters, such as for example the diisobutyl ester of phthalic acid; polyethers, such as for example polyether polyols and polyalkylene oxides; amine oxides, such as for example octyldimethylamine oxide; carboxylic acids, such as for example hydroxybutanedioic acid; and fatty acid esters. As examples of aliphatic polyesters, mention may be made of polylactic acid and polycaprolactones.

Advantageously, (B) is a polyether and preferably chosen from oligomers or polymers having alkylene oxide units (e.g. ethylene or propylene oxide). By way of example, mention may be made of polyoxyethylene glycol, usually called polyethylene glycol (PEG), advantageously the number-average molecular weight $\overline{M}_n$ being between 400 and 15 000 g/mol and the melting point being between 50 and 80° C. As examples of PEG, mention may be made of PLURIOL ®E from BASF or POLYGLYKOL® from Clariant. It would not be outside the scope of the invention to use a blend of two or more polyethers.

These PEGs and other PEG examples are described in U.S. Pat. No. 5,587,429 and U.S. Pat. No. 5,015,693. Thus, mention may be made of:

polyethylene glycol of formula H(OC$_2$H$_4$)$_n$OH where n is an integer of around 76, between 70 and 80;

H(OC$_2$H$_4$)$_d$[OCH(CH$_3$)CH$_2$]$_e$(OC$_2$H$_4$)$_f$OH where d, e and f denote integers with d+f being around 108, between 100 and 110, and e being around 35, between 30 and 40;

CARBOWAX 3350, having a number-average molecular mass of approximately 3500 g/mol;

CARBOWAX 8000, having a number-average molecular mass of approximately 8000 g/mol.

With regard to the process for preparing the masterbatch of the invention, the process comprises the following steps:

1). at least one fluoropolymer (A) and at least one interfacial agent (B) are intimately mixed at a temperature such that one at least is in the melt state throughout its mass or on its surface;

2). the blend obtained in step 1). is subsequently incorporated into a polyolefin (C), to form the masterbatch in granule form;

3). optionally, the masterbatch granules of step 2 are reground to give a powder of the masterbatch.

Step 1 is carried out with the aid of any means so that the two constituents (A) and (B) are intimately blended. It may be compacted in a heated press, injected into a heated mould, extruded or mixed. Extrusion or compacting is preferred.

The intimate blending of (A) and (B) is rather carried out at a temperature between 10 and 120° C., advantageously between 20 and 100° C., preferably between 40 and 100° C., more preferentially still between 60 and 100° C. Preference is given to mixing at a temperature such that the interfacial agent (B) has a viscosity which is too low to allow it to be mixed efficiently with the fluoropolymer (A) and to form an intimate blend. Advantageously, the temperature is selected so that the interfacial agent (B) is in the melt state throughout its mass or on its surface, preferably throughout its mass, and the fluoropolymer (A) is in the solid state.

A temperature of less than 100° C. allows the interfacial agent (B) not to be thermally degraded, which could affect its efficiency in the blend or could lead to yellowing. To promote intimate blending as well it is preferable for the fluoropolymer (A) to be in the form of a powder, in other words in dispersed form.

In the course of step 2, the blend of step 1 is incorporated into a polyolefin (C) to form the masterbatch. This is done using any tool for mixing plastic materials that is known to the skilled person. It may be an extruder or a compounder. Preferably it is an extruder. The masterbatch obtained at the end of step 2 is preferably in granule form.

Advantageously, (C) and (D) are similar. By similar is meant that (C) and (D) are two polyolefins of like kind—for example, (C) and (D) are two polyethylenes or else (C) and (D) are two polypropylenes—and/or that (C) and (D) have close-lying viscosities.

Advantageously, the proportion of (A) and (B) is from 1 to 30% per 99 to 70% of (C) respectively, preferably from 1 to 10% per 99 to 90% of (C) respectively, preferentially from 1.5 to 10% per 98.5 to 90% of (C) respectively, and more preferentially still from 2 to 10% for 98 to 90% of (C) respectively.

The respective proportions of (A) and (B) by weight may be such that (A)/(B) is between 10/90 and 90/10, preferably between 30/70 and 70/30 and better still between 40/60 and 60/40.

Step 3, which is optional, consists in regrinding the masterbatch granules to give a masterbatch powder.

It would not be outside the scope of the invention if additives of the UV absorber or antioxidant type were added to the masterbatch. They may be added to (A), to (B) or directly to the masterbatch during one of steps 1 to 3.

This masterbatch may be incorporated as an additive (or processing aid) into a polyolefin (D) and it significantly reduces the time needed to obtain stable and defect-free extrusion within an extrusion parameter range that normally exhibits substantial extrusion instabilities.

The masterbatch is particularly useful as a processing aid for extruding a film of a polyolefin (D). The masterbatch is used in granule form or in the form of a powder.

The masterbatch may be used to improve the extrusion of the following polyolefines:

polyethylenes, especially low-density polyethylenes (LDPE), high-density polyethylenes (HDPE), linear low-density polyethylenes (LLDPE) and also polyethylenes obtained using a metallocene-type catalyst or, more generally, a "single-site" catalyst;

polypropylenes, especially isotactic and syndiotactic polypropylenes;

polybutenes (obtained from but-1-ene);

poly(3-methylbutene)s and poly(4-methylpentene)s.

The masterbatch is of particular advantage for high molecular mass polyethylenes and/or polyethylenes exhibiting a narrow molecular mass distribution (typically such that the polydispersity index is less than 3, more preferably less than 2.5, and more preferably still less than 2.2).

It is particular useful for the extrusion of a polyolefin, especially a polyethylene, in film form.

The proportion of masterbatch to be introduced into the polyolefin (D) to be extruded is advantageously such that the quantity of (A)+(B) with respect to (D) is around 100 ppm to 3000 ppm.

EXAMPLES

In the following examples, all the film extrusion trials were carried out at 8 kg/hour. In the examples below, the molten polymer (D) used as the basis of this study was a 70 wt % polyethylene (INNOVEX LL0209AA)/30 wt % polyethylene (LACQTENE 1003FE23) blend. This blend is called blend (D).

INNOVEX LL0209AA denotes a linear low-density polyethylene of the type having an MFI of 0.9 g/10 min at 190° C./2.16 kg, sold by BP Chemicals.

LACQTENE 1003FE23 denotes a low-density polyethylene with an MFI (Melt Flow Index) of 0.3 g/10 min at 190° C./2.16 kg, sold by Total Petrochemicals (previously sold by Atofina).

KYNARFLEX®2821: a VF2-HFP thermoplastic PVDF copolymer in powder form sold by Arkema (previously by Atofina) with an MVI (Melt Volume Index) of 1.5 cm$^3$/10 minutes under a load of 5 kg at 230° C.

Example 1

According to the Invention

A blend consisting of 45% by weight of PEG (POLYGLYKOL® 10 000) powder from Clariant having a molecular weight of 10 000 g/mol and of 55% by weight of a PVDF-co-HFP (KYNARFLEX 2821, melt temperature around 190° C.) powder from Arkema was prepared on a twin-screw extruder of the Haake 2 type. This blend was produced at 90° C. The rod obtained was hauled off onto an endless belt and granulated. This product was then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect completely disappeared after 90 minutes from introducing the masterbatch MB.

Example 2

According to the Invention

A blend consisting of 45% by weight of PEG (POLYGLYKOL® 10 000) powder from Clariant having a molecular weight of 10 000 g/mol and of 55% by weight of a PVDF-co-HFP (KYNARFLEX 2821) powder from Arkema was prepared in a compacting machine. This blend was produced at 20° C. The granules obtained were then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. 90 minutes after introducing the masterbatch, some residual defect remained over a small area of the film produced.

Example 3

Comparative Example

A dry blend consisting of 45% by weight of PEG (POLYGLYKOL® 10 000) powder from Clariant having a molecular weight of 10 000 g/mol and of 55% by weight of a PVDF-co-HFP (KYNARFLEX 2821) powder from Arkema was prepared. This blend was produced at 20° C. This product was then incorporated by extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect persisted over a substantial portion of the film produced 90 minutes after introducing the masterbatch.

Example 4

Comparative Example

Extrusion at 190° C. of the blend (D) on a Collin film-bubble extrusion-blowing line with a screw diameter of 30 mm, an L/D of 25, a 50.5 mm diameter die and a gap of 0.8 mm. During this extrusion, the melt fracture defect appeared instantaneously. After 120 minutes of extrusion, the defect persisted over the entire film produced, and the experiment was stopped.

Example 5

According to the Invention

A blend consisting of 45% by weight of PEG (POLYGLYKOL® 10 000) from Clariant having a molecular weight of 8000 g/mol and of 55% by weight of a PVDF-co-HFP (KYNARFLEX 2821) powder from Arkema was prepared in a compacting machine. This blend was produced at 20° C. The granules obtained were then incorporated by single-screw extrusion in an amount of 2% by weight into a metallocene polyethylene M1 of 0.927 density. This masterbatch (MB), which was in the form of granules, was then tested as processing aid according to the protocol described below:

Extrusion at 190° C. of the metallocene polymer M1 on a Collin extrusion line with a screw diameter of 30 mm, an L/D of 25, a sheet die of 50 mm in width and a gap of 0.5 mm. During this extrusion, melt fracture appeared instantaneously. After 15 minutes of extrusion, the masterbatch MB described above was introduced in an amount of 1% by weight. The defect disappeared after 60 minutes from introducing the masterbatch MB.

Example 6

Comparative Example

A blend consisting of 45% by weight of PEG (POLYGLYKOL® 10 000) from Clariant having a molecular weight of 8000 g/mol and of 55% by weight of a PVDF-co-HFP (KYNARFLEX 2821) powder from Arkema was prepared by simple dry blending. This blend was produced at 20° C. The powder obtained was then incorporated by single-screw extrusion in an amount of 2% by weight into a metallocene polyethylene M1. This masterbatch (MB), which was in the form of granules, was then tested as processing aid according to the protocol described below:

Extrusion at 190° C. of the metallocene polymer M1 on a Collin extrusion line with a screw diameter of 30 mm, an L/D of 25, a sheet die of 50 mm in width and a gap of 0.5 mm. During this extrusion, the melt fracture defect appeared instantaneously. After 15 minutes of extrusion, the masterbatch MB described above was introduced in an amount of 1% by weight. The defect persisted over a large portion of the sample 60 minutes after introducing the masterbatch MB.

Example 7

Comparative Example

Extrusion at 190° C. of the metallocene polymer (M1) on a Collin extrusion line with a screw diameter of 30 mm, an L/D of 25, a sheet die of 50 mm in width and a gap of 0.5 mm. During this extrusion, the melt fracture defect appeared instantaneously. After 90 minutes, the defect persisted over the entire sample.

Examnple 8

According to the Invention

A blend consisting of 45% by weight of PEG (POLYGLYKOL® 8000 PF) powder from Clariant having a molecular weight of 8000 g/mol and of 55% by weight of a PVDF-co-HFP (KYNARFLEX 2821 powder from Arkema was prepared on a supercompounder of the ZSK40 type. This blend was produced at 65° C. The rod obtained was hauled off onto an endless belt and granulated. This product was then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect completely disappeared after 60 minutes from introducing the masterbatch MB.

Example 9

According to the Invention

A blend consisting of 45% by weight of PEG (POLYGLYKOL® 8 000 PF) powder from Clariant having a molecular weight of 8000 g/mol and of 55% by weight of a PVDF-co-HFP (KYNARFLEX 2821) powder from Arkema was prepared in a compacting machine. This blend was produced at 20° C. The granules obtained were then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect completely disappeared after 60 minutes from introducing the masterbatch MB.

Example 10

According to the Invention

The blend produced under the conditions of Example 8 in granule form was subsequently subjected to cold grinding. This powder was then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect completely disappeared after 60 minutes from introducing the masterbatch MB.

Example 11

According to the Invention

The blend produced under the conditions of Example 9 in granule form was subsequently subjected to cold grinding. This powder was then incorporated by single-screw extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect completely disappeared after 60 minutes from introducing the masterbatch MB.

Example 12

Comparative Example

A dry blend consisting of 45% by weight of PEG (POLYGLYKOL® 8 000 PF) powder from Clariant having a molecular weight of 8000 g/mol and of 55% by weight of a PVDF-co-HFP (KYNARFLEX 2821) powder from Arkema was prepared. This blend was produced at 20° C. This product was then incorporated by extrusion in an amount of 5% by weight into a linear low-density polyethylene of the INNOVEX LL0209AA type, having an MFI of 0.9 g/10 min at 190° C./2.16 kg. This masterbatch (MB), which was in the form of granules, was then tested as processing aid according to the protocol described below:

Extrusion at 190° C. of the blend (D) on a Collin film-bubble extrusion-blowing line with a screw diameter of 30 mm, an L/D of 25, a die of 50.5 mm in diameter and a gap of 0.8 mm. During this extrusion, the melt fracture defect appeared instantaneously. After 15 minutes of extrusion, the masterbatch MB described above was introduced in an amount of 1% by weight. The defect persisted over a substantial portion of the film produced 60 minutes after introducing the masterbatch.

Example 13

Comparative Example

Extrusion at 190° C. of the blend (D) on a Collin film-bubble extrusion-blowing line with a screw diameter of 30 mm, an L/D of 25, a 50.5 mm diameter die and a gap of 0.8 mm. During this extrusion, the melt fracture defect appeared instantaneously. After 120 minutes of extrusion, the defect persisted over the entire film produced, and the experiment was stopped.

What is claimed is:

1. A masterbatch comprising an intimate fluoropolymer/interfacial agent blend dispersed in a polyolefin matrix, comprising by weight:
   from 1 to 50% of an intimate blend of at least one fluoropolymer (A) and at least one interfacial agent (B); and
   from 99 to 50% of a polyolefin (C);
   wherein the respective proportions of (A) and (B) by weight are such that (A)/(B) is between 30/70 and 70/30.

2. The masterbatch according to claim 1, wherein the fluoropolymer is a polyvinylidene fluoride (PVDF) homopolymer or copolymer.

3. The masterbatch according to claim 2, in which the PVDF contains, by weight, at least 50% vinylidene difluoride (VDF).

4. The masterbatch according to claim 3, in which the PVDF contains, by weight, at least 75% VDF.

5. The masterbatch according to claim 4, in which the PVDF contains, by weight, at least 85% VDF.

6. The masterbatch according to claim 2, in which the comonomer is hexafluoropropylene (HFP).

7. The masterbatch according to claim 1, wherein the interfacial agent (B) is polyoxyethylene glycol.

8. The masterbatch according to claim 1, in which the proportion of (A) and (B) is from 1 to 30% per 99 to 70% of (C) respectively.

9. The masterbatch according to claim 8, in which the proportion of (A) and (B) is from 1 to 10% per 99 to 90% of (C) respectively.

10. The masterbatch according to claim 1, in which the respective proportions of (A) and (B) by weight are such that (A)/(B) is between 40/60 and 60/40.

11. A composition for the extrusion of polyolefin (D) comprising the masterbatch of claim 1 and a polyolefin (D).

12. The composition of claim 11 comprising an extruded film.

13. The composition of claim 11 wherein the proportion of masterbatch in the polyolefin (D) to be extruded is such that the quantity of (A)+(B) with respect to (D) is from 100 ppm to 3000 ppm.

14. The masterbatch of claim 1, wherein the two constituents (A) and (B) are intimately blended beforehand at a temperature such that at least one is in the melt state throughout its mass or on its surface, and are then blended with the polyolefin (C).

15. The masterbatch according to claim 14, wherein the blend of (A) and (B) is produced at between 10 and 120° C.

16. The masterbatch according to claim 14, wherein the blend is produced at a temperature selected such that the interfacial agent (B) is in the melt state throughout its mass or on its surface and the fluoropolymer (A) is in the solid state.

* * * * *